United States Patent [19]

Yasue et al.

[11] 3,917,807
[45] Nov. 4, 1975

[54] METHOD FOR PRODUCING ANHYDROUS SODIUM DITHIONITE
[75] Inventors: Masayuki Yasue, Nara; Sizuo Saito, Toyonaka; Sumio Shimojo, Suita; Kazuhisa Shiode, Osaka, all of Japan
[73] Assignee: Sumitomo Chemical Company, Ltd., Osaka, Japan
[22] Filed: Oct. 26, 1970
[21] Appl. No.: 84,187

[30] Foreign Application Priority Data
Oct. 30, 1969 Japan................................ 44-87458
Feb. 5, 1970 Japan................................ 45-10528

[52] U.S. Cl. .............................................. 423/515
[51] Int. Cl.$^2$......................................... C01B 17/66
[58] Field of Search ........ 23/116; 252/188; 423/515

[56] References Cited
UNITED STATES PATENTS
3,411,875  11/1968  Yoshikawa et al. .................. 23/116
3,576,598  4/1971  Plentovich et al. .................. 23/116

FOREIGN PATENTS OR APPLICATIONS
1,148,248  4/1969  United Kingdom.................. 23/116

Primary Examiner—Earl C. Thomas
Attorney, Agent, or Firm—Stevens, Davis, Miller & Mosher

[57] ABSTRACT

A process for producing anhydrous sodium dithionite, which comprises introducing 10 to 75 % by weight of the amount required for the completion of the reaction, of sulfur dioxide into a mixture of sodium formate and an alkali metal compound at a temperature of 70° to 150°C, and then introducing the remaining 90 to 25 % by weight of sulfur dioxide into the mixture at a temperature of 60° to 85°C.

5 Claims, No Drawings

METHOD FOR PRODUCING ANHYDROUS SODIUM DITHIONITE

This invention relates to a process for producing anhydrous sodium dithionite, and more perticularly to an improved method for producing the same from sodium formate, sulfur dioxide and an alkali metal compound.

Sodium dithionite is widely used in the field of dyeing and bleaching of fibrous materials owing to its reducing ability.

There is known, for example, in U.S. Pat. No. 2,010,615 and others, a process for producing sodium dithionite comprising reacting sodium formate, sulfur dioxide and an alkali metal compound (hereinafter referred to as the formic acid process).

The product obtained according to these known processes is in the form of fine powder which renders the practical use seriously troublesome owing to its dusty property.

An object of the present invention is to provide a process for producing sodium dithionite having improved particle size.

Other object of the present invention is to provide a process for producing sodium dithionite without accompanying substantial decomposition thereof despite the reaction is effected at a relatively high temperature.

Efforts have been directed to a study to achieve the above objects, and it has been found that the production of sodium dithionite having improved particle size is feasible by effecting the initial reaction at a relatively high temperature.

In connection with the above fact, it has also been found that the decomposition of sodium dithionite formed can be avoided by controlling the reaction temperature during the addition of sulfur dioxide to be reacted.

Thus, the present invention provides a process for producing anhydrous sodium dithionite having improved particle size in a high yield, which comprises introducing part of sulfur dioxide required for the completion of the reaction to a mixture of sodium formate and an alkali metal compound at a temperature of 70° to 150°C, and then introducing the remaining sulfur dioxide thereto at a temperature of 60° to 85°C. According to the formic acid process, sodium dithionite is formed through the following reactions:

$$NaOH + SO_2 \rightarrow NaHSO_3 \quad \quad 1$$
$$HCOONa + SO_2 + H_2O \rightarrow HCOOH + NaHSO_3 \quad \quad 2$$
$$HCOOH + 2NaHSO_3 \rightarrow Na_2S_2O_4 + CO_2 + 2H_2O \quad \quad 3$$

Thus, sodium hydrogensulfite is formed according to the reactions (1) and (2), and is allowed to react with formic acid formed simultaneously in the reaction (2) to yield sodium dithionite according to the reaction (3). In the formic acid process, the reaction (3) does not proceed unless the reaction temperature exceeds 50°C. For example, in U.S. Pat. No. 2,010,615, sulfur dioxide is introduced into an alcoholic aqueous solution of sodium formate and an alkali metal compound at a temperature of 30°C or lower and thereafter the reaction system is carefully heated at 60°C or higher, and for example, in the examples of British Pat. No. 11,010 and U.S.S.R. Pat. No. 52,052 sulfur dioxide or an alcoholic solution thereof is introduced into the reaction system at a temperature of 70°C.

Sodium dithionite is very labile, especially when it is heated and is kept in an acidic system, and therefore it was considered that the introduction of sulfur dioxide, and heating for completion of the reaction must be conducted under a condition where sodium dithionite produced must not be decomposed. Therefore, the introduction of sulfur dioxide has been conducted at a temperature of not higher than 70°C.

According to the present invention, in the first stage, 10 to 75%, preferably 15 to 40% by weight of the amount required for the completion of the reaction, of sulfur dioxide in the form of an alcohol solution is introduced into a mixture of sodium formate and an alkali metal compound at a temperature of 70° to 150°C, preferably 72° to 110°C, and thereafter the remaining 90 to 25% by weight of sulfur dioxide in the form of an alcohol solution is introduced thereinto at a temperature of 60° to 85°C, preferably 70° to 85°C, at which the mixture is successively stirred in order to complete the reaction. Thus, a product having an improved particle size may be obtained in a high yield and a high purity.

The relationship between the reaction temperature and the distribution of particle size of the product, sodium dithionite, is shown in Table 1.

Table 1

| Introduction of SO₂-methanol First stage | | Introduction of SO₂-methanol Second stage | | Temperature for the completion of the reaction (°C) | Yield based on SO₂ (%) | Purity (%) | Particle size (μ) | | | |
|---|---|---|---|---|---|---|---|---|---|---|
| Amount (%) | Temperature (°C) | Amount (%) | Temperature (°C) | | | | >105 | 105–74 | 74–46 | <46 |
| 0→100 | 30 | — | — | 75 | 81 | 89 | 0% | 0% | 0% | 100% |
| 0→100 | 70 | — | — | 75 | 82 | 89 | 2 | 17 | 54 | 27 |
| 0→50 | 75 | 50→100 | 75 | 75 | 82 | 90 | 3 | 47 | 35 | 14 |
| 0→50 | 80 | 50→100 | 75 | 75 | 82 | 89 | 19 | 47 | 25 | 7 |
| 0→30 | 85 – 90 | 30→100 | 75 | 75 | 83 | 90 | 30 | 41 | 20 | 8 |
| 0→25 | 95 – 100 | 25→100 | 75 | 75 | 82 | 89 | 42 | 35 | 12 | 9 |
| *0→100 | 95 – 100 | — | — | 75 | 0 | decomposed | — | — | — | — |

*When the total amount required for the completion of the reaction, of SO₂-methanol was introduced at once at a high temperature, the product was not obtained because of its decomposition.

From the following Table 2, it is clear that the particle size of the product depends on the temperature of the first stage.

Table 2

| Introduction of SO₂-methanol First stage | | Introduction of SO₂-methanol Second stage | | Temperature for the completion of the reaction (°C) | Particle size ($\mu$) | | | |
|---|---|---|---|---|---|---|---|---|
| Amount (%) | Temperature (°C) | Amount (%) | Temperature (°C) | | >105 | 105–74 | 74–46 | <46 |
| 0→25 | 80 | 25→100 | 73 | 73–80 | 16 | 42 | 21 | 11 |
| 0→50 | 80 | 50→100 | 73 | 73–80 | 28 | 45 | 16 | 9 |
| 0→75 | 80 | 75→100 | 73 | 73–80 | 14 | 55 | 19 | 9 |
| 0→75 | 70 | 75→100 | 80 | 80 | 2 | 17 | 54 | 27 |
| 0→75 | 80 | 75→100 | 70 | 70 | 20 | 50 | 20 | 8 |
| 0→75 | 80 | 75→100 | 80 | 80 | 27 | 26 | 38 | 7 |
| 0→25 | 95–100 | 25→100 | 75 | 75 | 42 | 35 | 12 | 9 |
| 0→25 | 95–100 | 25→100 | 80 | 80–84 | 39 | 38 | 14 | 8 |

The present invention will be explained in more detail as follows.

The alkali metal compound used in the present process is sodium hydroxide, sodium carbonate, sodium bicarbonate, sodium hydrogensulfite, sodium metabisulfite, sodium sulfite or a mixture thereof and it is preferable to use sodium hydroxide. In case where at least one of said sulfites is used as the alkali metal compound, it is needless to say that an amount of sulfur dioxide may be deducted. The alcohols used in the present invention are methanol, ethanol and a mixture thereof. It is preferable from economical point of view to use methanol. In carrying out the present process, the use of an alcohol solution of sulfur dioxide is more preferable than the use of gaseous sulfur dioxide. The U.S.S.R. Pat. No. 52,052 also discloses the advantages due to the use of an alcohol solution of sulfur dioxide that the use of the solution is easy to handle and results in preventing the decomposition of sodium dithionite produced, because the reaction mixture may be prevented from a partial strong acidification, as the acidification is moderated by the formation of a complex between sulfur dioxide and an alcohol and by the addition of the complex formed in a dilute state. A concentration of sulfur dioxide in the alcohol is 20 to 35 % by weight, preferably 22 to 30 % by weight.

A mixture of sodium formate and the alkali metal compound is dissolved or suspended in water or a mixture of water and an alcohol. It is needless to say that the alcohol recovered by means of distillation after the completion of the reaction, may be used as a source of an alcohol. The alcohol recovered may contain a small amount of a formic acid ester. When the reaction of the first stage in the present process is conducted at a temperature higher than the boiling point of the solvent used, the reaction is conducted under an increased pressure, for example, by means of the introduction of an inactive gas such as nitrogen or carbon dioxide gas. On the other hand, a suitable pressure may be obtained by the control of carbon dioxide which is produced as the reaction proceeds to produce sodium dithionite.

In carrying out the present process, the preferable amount ratio of the materials will given as follows. When sodium hydroxide and methanol are used respectively as the alkali metal compound and the alcohol, on the basis of 64 parts of sulfur dioxide, 42 to 80 parts of sodium formate, 12 to 22 parts of sodium hydroxide, 42 to 80 parts of water and 190 to 300 parts of methanol are used, all the parts being by weight. In the case where the alcohol containing a formic acid ester is used, sodium hydroxide may be used in an amount larger than that described above, because part or all of the formic acid ester contained in the alcohol is converted to sodium formate by the reaction between sodium hydroxide and the formic acid ester. In accordance with the present invention sodium dithionite may be produced with improved particle size without its decomposition, and it becomes feasible to enhance the market value of the product which has hitherto been low due to its dusty property.

Besides non-dusty property, the product obtained by the process of the invention has such advantages as good flowability and stability due to its monocrystal.

The invention will be explained in more detail by referring to the following Examples, which are, of course, not to limit the scope of the invention. Parts and percent mentioned each are by weight.

EXAMPLE 1

120 Parts of sodium formate, 90 parts of water, 67 parts of a 48 percent aqueous solution of sodium hydroxide and 100 parts of methyl alcohol were mixed in an autoclave under a pressure of 1 Kg/cm² (Gauge) with nitrogen at a temperature of 75°C.

While maintaining the temperature at 75° to 80°C, a solution containing 128 parts of sulfur dioxide in 380 parts of methyl alcohol was added thereto over a period of 3 hours and the mixture was kept at the same temperature for additional 3 hours.

During the reaction, carbon dioxide generated was gradually removed to maintain the pressure at 1 Kg/cm² (Gauge), and the temperature was kept at 75° to 80°C. After the reaction was over, the content of the autoclave was allowed to cool to 50°C, and filtered under nitrogen atmosphere. The solid separated was washed sufficiently with methyl alcohol, dried under reduced pressure or under nitrogen atmosphere. Thus, 143 parts of anhydrous sodium dithionite was obtained in a purity of 90 percent. The product was not dusty and its particle size distribution is shown in the following Table 3.

Table 3

| Particle size ($\mu$) | >105 | 105–74 | 74–46 | <46 |
|---|---|---|---|---|
| Distribution (%) | 8 | 48 | 26 | 15 |

EXAMPLE 2

A mixture of 120 parts of sodium formate, 90 parts of water, 67 parts of a 48 percent aqueous solution of sodium hydroxide and 100 parts of methyl alcohol was heated to 80°C under a pressure of 1.0 Kg/cm² (Gauge) with nitrogen. To the mixture, a solution containing 64 parts (50 % of the amount required for the completion of the reaction) of sulfur dioxide in 190 parts of methyl alcohol was added at 80°C, and thereafter the temperature was lowered to 73°C. At said temperature, a solution containing 64 parts (50 % of the amount required for the completion of the reaction) of sulfur dioxide in 190 parts of methyl alcohol was added to the mixture during 3 hours. The mixture was further kept at 73° – 80°C for additional 3 hours, during which carbon dioxide produced was gradually removed out of the reaction system to keep the pressure at 1.0 Kg/cm$^2$ (Gauge). After the reaction was over, the subsequent procedures were carried out as described in Example 1. 143 Parts of anhydrous sodium dithionite having a purity of 90 percent was obtained. The particle size distribution of the product is shown in the following Table 4.

Table 4

| Particle size ($\mu$) | >105 | 105–74 | 74–46 | <46 |
|---|---|---|---|---|
| Distribution (%) | 28 | 45 | 16 | 9 |

EXAMPLE 3

A mixture of 120 parts of sodium formate, 90 parts of water, 67 parts of a 48 percent aqueous solution of sodium hydroxide and 100 parts of methyl alcohol was heated to 95°C under a pressure of 1.5 Kg/cm$^2$ (Gauge) with nitrogen. To the mixture, a solution containing 32 parts (25 % of the amount required for the completion of the reaction) of sulfur dioxide in 95 parts of methyl alcohol was added at 95° to 100°C, and thereafter the temperature was lowered to 75°C. At said temperature, a solution containing 96 parts (75 % of the amount required for the completion of the reaction) of sulfur dioxide in 285 parts of methyl alcohol was added to the mixture during 3 hours. The mixture was further kept at 75°C for additional 3 hours, during which carbon dioxide produced was gradually removed out of the reaction system to keep the pressure at 1.5 Kg/cm$^2$ (Gauge). After the reaction was over, the temperature was lowered to a temperature of 50°C or less and the reaction mixture was filtered under nitrogen atmosphere to separate crystals, which were washed sufficiently with methyl alcohol and dried under a reduced pressure or nitrogen atmosphere. Thus, 142 parts of anhydrous sodium dithionite having a purity of 89 % was obtained. The particle size distribution is shown in the following Table 5.

Table 5

| Particle size ($\mu$) | >105 | 105–74 | 74–46 | <46 |
|---|---|---|---|---|
| Distribution (%) | 42 | 35 | 12 | 9 |

EXAMPLE 4

120 Parts of sodium formate, 125 parts of water, 80 parts of sodium hydrogensulfite and 170 parts of methyl alcohol were mixed in an autoclave under a pressure of 1 Kg/cm$^2$ (Gauge) with nitrogen at 80°C, and was then charged with 380 parts of a methyl alcohol solution containing 80 parts of sulfur dioxide for a period of 2 hours while maintaining the temperature at 75° to 80°C.

The subsequent procedures were same as described in Example 1 and 144 parts of anhydrous sodium dithionite having a purity of 90 percent was obtained.

The particle size distribution of the product is shown in the following Table 6.

Table 6

| Particle size ($\mu$) | >105 | 105–74 | 74–46 | <46 |
|---|---|---|---|---|
| Distribution (%) | 31 | 43 | 18 | 8 |

EXAMPLE 5

A mixture of 120 parts of sodium formate, 125 parts of water, 50 parts of sodium sulfite and 170 parts of methyl alcohol was once heated to 90°–95°C under a pressure of 2 Kg/cm$^2$ (Gauge) of nitrogen in an autoclave. Then, the content of the autoclave was allowed to cool to 80°C, and added with 400 parts of a methanol solution containing 100 parts of sulfur dioxide over a period of 2.5 hours. The subsequent procedure was carried out as described in Example 1, and 142 parts of sodium dithionite having a purity of 89 percent was obtained.

The particle size distribution of the product is shown in Table 7.

Table 7

| Particle size ($\mu$) | >105 | 105–74 | 74–46 | <46 |
|---|---|---|---|---|
| Distribution (%) | 25 | 42 | 21 | 7 |

What is claimed is:

1. In the preparation of anhydrous sodium dithionite by a process wherein sulfur dioxide is mixed with sodium formate and an alkali metal compound, the method which produces anhydrous sodium dithionite of improved particle size which comprises adding a methanol solution of sulfur dioxide to a solution or suspension of sodium formate and an alkali metal compound in two steps with from about 10 % to about 75 % by weight of the total sulfur dioxide used being mixed with the solution or suspension of sodium formate and alkali metal compound at a temperature of 70°C. to 150°C. in the first step and the remainder of the sulfur dioxide being added in a second step at a lower temperature within the range of 60°C. to 85°C.

2. A process according to claim 1, wherein a concentration of sulfur dioxide in the alcohol is 20 to 35 % by weight.

3. A process according to claim 1, wherein the mixture of sodium formate and the alkali metal compound is dissolved or suspended in water or a mixture of water and an alcohol.

4. A process according to claim 1, wherein the alkali metal compound is sodium hydroxide, sodium carbonate, sodium bicarbonate, sodium hydrogensulfite, sodium metabisulfite, sodium sulfite or a mixture thereof.

5. A method for making sodium dithionite of improved particle size which comprises preparing an aqueous solution or suspension of sodium formate and an alkali metal compound and adding to the resulting aqueous solution or suspension a methanol solution of sulphur dioxide in two steps with from about 10 % to about 75 % by weight of the sulphur dioxide being added the solution or suspension at a temperature of 70°C. to 150°C. in a first step and the remainder of the sulphur dioxide being added in a second step at a lower temperature within the range of 60°C. to 85°C.

* * * * *